3,065,188
POLYMERS OF DIHALOBUTENE OXIDES
Edwin J. Vandenberg, Wilmington, Del., assignor to Hercules Powder Company, Wilmington, Del., a corporation of Delaware
No Drawing. Filed Dec. 22, 1961, Ser. No. 161,377
4 Claims. (Cl. 260—2)

This invention relates to new crystalline poly(epoxide)s and more particularly to crystalline polymers of 1,4-dihalo-2-butene oxides.

In accordance with this invention it has been discovered that both cis- and trans-1,4-dihalo-2-butene oxides can be homopolymerized to yield crystalline polymers having outstanding properties. It was entirely unexpected that a compound such as this, having two asymmetric carbon atoms, could be homopolymerized to produce a stereoregular polymer and which was crystalline.

Any 1,4-dihalo-2-butene oxide wherein both halogens are the same can be homopolymerized to produce the new crystalline polymers of this invention. Thus, both the trans- and cis-difluoro-, dichloro-, dibromo- or diiodobutene-2-oxides can be polymerized to yield crystalline polymers. The polymers from the trans monomers are believed to be meso-diisotactic polymers, having dl—dl carbon sequences, and the polymers from the cis monomers are believed to be racemic diisotactic polymers with dd—dd and ll—ll carbon sequences.

The new crystalline 1,4-dihalo-2-butene oxide polymers of this invention find use in both plastic and wax applications. Thus, for example, the high molecular weight polymers can be fabricated into films, fibers, and molded articles, particularly where solvent resistance and flame resistance are desired. The lower molecular weight polymers are useful as additives for plastics, elastomers, waxes, protective coatings, etc., to decrease inflammability and improve solvent resistance. These new polymers can also be cross-linked with diamines, alone or in combination with other similarly vulcanizable polymers such as polyepichlorohydrin, polychloroprene, etc.

The new polymeric epoxides of this invention may be prepared by contacting either trans- or cis-1,4-dihalobutene-2 oxide with an aluminum alkyl as catalyst. Any aluminum alkyl may be used as, for example, a trialkylaluminum, a dialkylaluminum halide, a dialkylaluminum hydride, an alkylaluminum dihydride, a dialkylaluminum alkoxide, etc. The alkylaluminum compound may be used as such, or it may be complexed with an ether such as tetrahydrofuran, a chelating agent such as acetylacetone, or with water within specified molar ranges. For the preparation of a trans polymer a trialkylaluminum is preferably used, which alkylaluminum compound has not been complexed or reacted with water, ether, chelating agents, etc. However, in the case of the cis-isomer, to produce a polymer having a sufficiently high molecular weight the aluminum alkyl used as the catalyst will be prereacted or complexed with water and/or a complexing or chelating agent. When water is used, the amount will usually be within the range of 0.5 to 1 mole of water per mole of alkylaluminum compound, but a ratio of from about 0.1:1 to about 2:1 may be used. The alkyl group of the alkylaluminum compound may be any alkyl, as for example, methyl, ethyl, isopropyl, butyl, isobutyl, hexyl, octyl, etc.

Another factor to be considered in the preparation of the new crystalline polymers of the cis- and trans-1,4-dihalo-butene-2 oxides, is the purity of the monomer. It is essential that the monomer being polymerized be essentially pure, particularly in the case of the trans-isomer and contain no appreciable amount of the other isomer since mixtures of the two isomers will not form a crystalline trans polymer.

The polymerization reaction may be carried out in bulk but generally is carried out in a solution or suspension in an inert organic diluent. Exemplary of the diluents that may be used are the ethers such as diethyl ether, dipropyl ether, etc., halogenated hydrocarbons such as chlorobenzene, methylene chloride, etc., or a hydrocarbon diluent such as n-heptane, cyclohexane, benzene, toluene, etc.

The polymerization reaction can be carried out at any desired temperature and pressure. Usually atmospheric or autogenous pressure will be used and a temperature of from about −100° C. to about 150° C., and preferably from about −50° C. to about 120° C. For the trans-isomer, with the preferred trialkylaluminum catalysts, low temperatures are preferred for the polymerization, generally less than about 50° C. and preferably less than about 30° C. In the case of the cis-isomer, the opposite situation prevails. Here to obtain crystalline polymer, high temperatures are required, i.e. preferably over 30° C., and more preferably above 50° C., and the preferred catalyst is a chelated aluminum alkyl or a chelated aluminum alkyl-water reaction product.

The following examples will illustrate the preparation of the new polymeric epoxides of this invention. All parts and percentages are by weight unless otherwise indicated. The molecular weight of the polymers is shown by their reduced specific viscosity (RSV). By the term "reduced specific viscosity" is meant the $\eta sp/c$ determined on a 0.1% solution of the polymer in tetrachloroethane at 100° C. Where the melting point of the polymer is given, it is the temperature at which the birefringence due to crystallinity disappears. All parts and percentages are by weight unless otherwise indicated.

*Example 1*

A polymerization vessel from which the air had been removed and replaced with nitrogen was charged with 1.0 part of trans-1,4-dichloro-2,3-epoxy butane and 1.0 part of anhydrous benzene. After equilibrating at 0° C., a solution of 0.046 part of triethylaluminum in 0.15 part of n-heptane was added. After 19 hours, another equal portion of catalyst was added. After a total of 43 hours at 0° C., the solid reaction mixture was treated with 0.4 part of anhydrous ethanol to stop the polymerization. The polymer was isolated by adding sufficient ether to make the solution of low viscosity for ease in handling, then washing the reaction mixtures first with a 3% aqueous solution of hydrogen chloride, then with water until neutral, then with a 2% aqueous solution of sodium bicarbonate and again with water. The ether-insoluble polymer was then separated, washed once with ether, and once with a 0.1 % solution of Santonox, i.e. 4,4'-thiobis(6-tert-butyl-m-cresol), in ether and dried. To the ether filtrate was added an amount of Santonox equal to 0.5% based on the polymer, the solvents were then removed, and the ether-soluble polymer so obtained was dried.

The ether-insoluble polymer was a hard, brittle, white solid which was shown to be crystalline by X-ray analysis, and had a RSV of 0.08 and a melting point of 111° C. It amounted to a conversion of 46%. Elemental analysis gave 34.45% carbon, 4.55% H and 49.7% Cl which agreed with the theoretical values for $C_4H_6Cl_2O$ of 34.05% carbon, 4.29% hydrogen and 50.3% chlorine.

The ether-soluble polymer was a soft solid which amounted to a conversion of 37%. It had an RSV of 0.08, was shown to be amorphous by X-ray and contained 46.6% chlorine.

*Example 2*

Ten parts of cis-1,4-dichloro-2,3-epoxy butane and 72 parts of toluene were mixed under nitrogen and with the temperature at 30° C., there was added 0.92 part of triethylaluminum which had been reacted with 0.5 mole of acetylacetone per mole of aluminum in a 70:30 ether: heptane solution (0.5 molar concentration of aluminum) at 0° C., stirred at that temperature for 2 hours and then allowed to warm to room temperature. The polymerization was run for 43 hours at 30° C. and then stopped by adding 4 parts of anhydrous ethanol. The reaction mixture was treated and the polymer isolated as described in Example 1. The ether-insoluble polymer was crystalline by X-ray analysis. It was further purified by extraction with acetone to give a more highly crystalline fraction which had a melting point above 150° C. An amorphous, ether-soluble polymer was isolated from the ether filtrate left after separation of the crystalline polymer.

What I claim and desire to protect by Letters Patent is:

1. As a new composition of matter, a crystalline homopolymer of a 1,4-dihalo-2-butene oxide.

2. As a new composition of matter, a crystalline homopolymer of a 1,4-dichloro-2-butene oxide.

3. As a new composition of matter, a crystalline homopolymer of trans-1,4-dichloro-2-butene oxide.

4. As a new composition of matter, a crystalline homopolymer of cis-1,4-dichloro-2-butene oxide.

No references cited.